(12) United States Patent
Su et al.

(10) Patent No.: US 9,717,102 B2
(45) Date of Patent: Jul. 25, 2017

(54) ACCESS METHOD FOR WIFI ACCESS POINT, WIFI ACCESS POINT AND WIFI SYSTEM

(71) Applicant: DATANG MOBILE COMMUNICATIONS EQUIPMENT CO.,LTD, Beijing (CN)

(72) Inventors: Xiaobo Su, Beijing (CN); Jianghai Duan, Beijing (CN); Ge Wang, Beijing (CN); Suling Zou, Beijing (CN); Jie Chen, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 276 days.

(21) Appl. No.: 14/353,029

(22) PCT Filed: Oct. 19, 2012

(86) PCT No.: PCT/CN2012/083223
§ 371 (c)(1),
(2) Date: Apr. 21, 2014

(87) PCT Pub. No.: WO2013/056675
PCT Pub. Date: Apr. 25, 2013

(65) Prior Publication Data
US 2014/0307686 A1 Oct. 16, 2014

(30) Foreign Application Priority Data
Oct. 21, 2011 (CN) .......................... 2011 1 0322722

(51) Int. Cl.
*H04W 4/00* (2009.01)
*H04W 76/02* (2009.01)
(Continued)

(52) U.S. Cl.
CPC ......... *H04W 76/02* (2013.01); *H04L 41/0809* (2013.01); *H04W 12/06* (2013.01);
(Continued)

(58) Field of Classification Search
CPC .......... H04L 29/12009; H04W 76/041; H04W 76/022
(Continued)

(56) References Cited

U.S. PATENT DOCUMENTS

2003/0051052 A1* 3/2003 Shteyn .............. H04L 29/12009
709/245
2005/0134683 A1* 6/2005 Quintana ............... H04N 7/185
348/61
(Continued)

FOREIGN PATENT DOCUMENTS

CN 1826015 A 8/2006
CN 1972231 A 5/2007
(Continued)

OTHER PUBLICATIONS

Zhang J et al: "virtual operator based AAA in wireless LAN hot spots with ad-hoc networking support", Mobile Computing and Communications Review, ACM, New York, NY, US, vol. 6, No. 3, Jul. 2002 (Jul. 2002), pp. 10-21, XP002390572, ISSN: 1091-1669.
(Continued)

*Primary Examiner* — Samina Choudhry
(74) *Attorney, Agent, or Firm* — Kilpatrick Townsend & Stockton LLP

(57) ABSTRACT

Disclosed are an access method for a WiFi access point, a WiFi access point and a WiFi system, which relate to communications technology. The present application adds to a WiFi system the RAN and PSCN of a 3G network, and adds a 3G module to an AP, so that the AP can serve as a 3G terminal to access the 3G network, thereby connecting the
(Continued)

AP and an AC/BRAS through the RAN and PSCN. Because the 3G network has broader coverage, implementing access point access through the 3G network reduces the complexity of an AP accessing the AC/BRAS.

10 Claims, 5 Drawing Sheets

(51) Int. Cl.
*H04L 12/24* (2006.01)
*H04W 12/06* (2009.01)
*H04L 29/12* (2006.01)

(52) U.S. Cl.
CPC ....... *H04W 76/022* (2013.01); *H04L 61/1511* (2013.01); *H04L 61/2015* (2013.01)

(58) Field of Classification Search
USPC ................................. 370/328, 338; 455/453
See application file for complete search history.

(56) References Cited

U.S. PATENT DOCUMENTS

| | | | | |
|---|---|---|---|---|
| 2006/0189322 A1* | 8/2006 | Conte | ............... | H04W 72/0406 455/453 |
| 2011/0002302 A1* | 1/2011 | Ding | ................... | H04W 76/041 370/331 |
| 2011/0317623 A1* | 12/2011 | Neil | .................... | H04W 76/022 370/328 |
| 2012/0057576 A1* | 3/2012 | Neil | ...................... | H04W 88/08 370/338 |
| 2014/0359740 A1* | 12/2014 | Yoon | ...................... | H04W 8/02 726/7 |

FOREIGN PATENT DOCUMENTS

| | | |
|---|---|---|
| CN | 101159646 A | 4/2008 |
| CN | 102026163 A | 4/2011 |
| CN | 102164390 A | 8/2011 |
| CN | 102217284 A | 10/2011 |
| CN | 102387608 A | 10/2011 |
| GB | 2465402 A | 5/2010 |
| WO | 2005079087 A1 | 8/2005 |
| WO | 2005086430 A1 | 9/2005 |
| WO | 2010083939 A1 | 7/2010 |
| WO | 2011007187 A1 | 1/2011 |

OTHER PUBLICATIONS

The Extended European Search Report issued on Nov. 26, 2015 in the EP counterpart application (12842434.8).
International Search Report and Written Opinion for PCT/CN2012/083223.

\* cited by examiner

ACCESS METHOD FOR WIFI ACCESS POINT, WIFI ACCESS POINT AND WIFI SYSTEM

This application is a US National Stage of International Application No. PCT/CN2012/083223, filed 19 Oct. 2012, designating the United States, and claiming priority to Chinese Patent Application No. 201110322722.5, filed with the State Intellectual Property Office of China on Oct. 21, 2011 and entitled "Access method for WiFi access point, WiFi access point and WiFi system", which is hereby incorporated by reference in its entirety.

FIELD OF THE INVENTION

The present invention relates to the field of communication and particularly to an access method for a WiFi access point, a WiFi access point and a WiFi system.

BACKGROUND OF THE INVENTION

At present, a Wireless Fidelity system includes a Station (STA, i.e., a WiFi user), an Access Point (AP), an Access Controller (AC), a Broadband Remote Application Server (BRAS), a portal server, a Remote Authentication Dial-in User Service (RADIUS) and other nodes, and FIG. 1 illustrates a schematic diagram of the WiFi system networking.

In FIG. 1, an interface between the STA and the AP is an air interface for wireless transmission in compliance with the specifications of the protocols IEEE802.11a/b/g/n, etc. An interface between the AP and the AC/BRAS complies with the specification of the Control And Provisioning of Wireless Access Point Protocol (CAPWAP) for wired transmission.

An operation process of the WiFi network can be roughly divided into three phases:

In phase 1, the WiFi access point accesses the WiFi system, which is a procedure in which the AP is powered on and accesses the AC, where the AP can obtain an Internet Protocol (IP) address of the AP through the Dynamic Host Configuration Protocol (DHCP) and obtain an IP address of the AC through the DHCP Options43 attribute or Domain Name System (DNS) resolving or otherwise. The AP which has obtained the IP address of the AC initiates actively an authentication connection with the AC. The AC verifies the AP and then establishes a Control And Provisioning of Wireless Access Point Protocol (CAPWAP) tunnel connection with the AP. The AP can download a corresponding configuration file from the AC over the CAPWAP tunnel to obtain configuration information and configure itself.

In phase 2, the WiFi user is authenticated. Firstly the WiFi user obtains an IP address through the standard DHCP, Where the address is allocated by the AC/BRAS; and thereafter the WiFi user accesses a web server and initiates a Hyper Text Transfer Protocol (HTTP) request. The AC/BRAS intercepts the HTTP request and forces the user to be authenticated with the portal server. The portal server pushes a web authentication page to the WiFi user. The user fills a user name, a password and other information into the authentication page and submits them to the portal server. The portal server sends a user information query request to the Remote Authentication Dial-in User Service (RADIUS) upon reception of the user information, and the RADIUS server verifies the user information.

In phase 3, WiFi user data is transmitted. After the WiFi user is authenticated, the AP transmits WiFi user data to the AC/BRAS over the CAPWAP tunnel. Taking uplink data as an example, an IP header in a CAPWAP message is filled as illustrated in FIG. 2, where the CAPWAP message includes an IP header, a User Datagram Protocol (UDP) header, a CAPWAP header and a CAPWAP payload, wherein the CAPWAP payload further includes an IP header and WiFi user data; and the IP header of the CAPWAP message is filled with slashes, and in the IP header of the CAPWAP message, a Source IP is the IP of the AP device, and a Target IP is the IP of the AC device; and the IP header of the CAPWAP payload is filled with vertical lines, and in the IP header of the CAPWAP payload, a Source IP is the IP of the WiFi user, and a Target IP is the IP of the accessed web.

As illustrated in FIG. 3, the operation process of the WiFi network includes the following steps:

The phase 1 includes the following steps:

In the step S301, the AP is powered on and initiates a DHCP request;

In the step S302, the AP obtains an IP address of the AP;

In the step S303, the AP Obtains an IP address of the AC;

In the step S304, the AP establishes a CAPWAP tunnel connection with the AC;

In the step S305, the AP configures itself;

In the step S306, the AC/BRAS allocates an IP address for the WiFi user; and

In the step S307, the WiFi user is authenticated and the data is transmitted.

The AP is an important transmitting medium in WiFi networking, and is typically connected with the AC/BRAS through a switcher, a router or other device in a wired connection manner. The wired connection manner may result in complicated and troublesome network wiring. The coverage area of the AP itself is small, so a large total number of APs may be required. Deployment of a sufficiently large number of APs outdoors means a high engineering cost and a long construction period.

Consequently, WiFi networking is typically limited to a hotspot indoors, and mobility may be supported poorly due to the technical characteristic of the WiFi system, on at least an interruption and even unavailability of a service may arise in some high mobility-demanding scenarios.

SUMMARY OF THE INVENTION

Embodiments of the present invention provide an access method for a WiFi access point, a WiFi access point and a WiFi system, so as to reduce the complexity of an access of an AP to an AC/BRAS.

An access method for a WiFi access point includes:

the access point accessing a 3G network and Obtaining its own IP address in the 3G network;

the access point obtaining an IP address of an AC through a preset AC domain name and an address server of the 3G network, wherein the AC is connected with the 3G network; and the access point establishing a connection with the AC through its own IP address in the 3G network.

A WiFi access point includes:

a 3G access component configured to access a 3G network and obtain an IP address of the WiFi access point in the 3G network;

an address obtainment component configured to obtain an IP address of an AC through a preset AC domain name and an address server of the 3G network, wherein the AC is connected with the 3G network; and a connection establishment component configured to establish a connection with the AC through the IP address of the WiFi access point in the 3G network.

A WiFi system includes an access point, a 3G network and an AC, wherein:

the access point is configured to access the 3G network and to obtain its own IP address in the 3G network; to obtain an IP address of the AC through a preset AC domain name and an address server of the 3G network, and to establish a connection with the AC through its own IP address in the 3G network; and the AC is connected with the 3G network and configured to establish the connection with the access point upon reception of a connection request of the access point.

Embodiments of the present invention provide an access method for a WiFi access point, a WiFi access point and a WiFi system, where a Radio Access Network (RAN) and a Packet Switch Core Network (PSCN) in a 3G network are added to the WiFi system, and a 3G component is added to an AP, so that the AP can access the 3G network as a 3G terminal, and the AP can be connected with an AC/BRAS through the RAN and the PSCN, and since the coverage area of the 3G network is wide, an access of the access point over the 3G network can reduce the complexity of an access of the AP to the AC/BRAS.

DETAILED DESCRIPTION OF THE EMBODIMENTS

Embodiments of the present invention provide an access method for a access point, a WiFi access point and a WiFi system, where an RAN and a PSCN in a 3G network are added into the WiFi system, and a 3G component is added into an AP, so that the AP can access the 3G network as a 3G terminal, and the AP can be connected with an AC/BRAS through the RAN and the PSCN, and since the coverage area of the 3G network is wide, an access of the access point over the 3G network can reduce the complexity of an access of the AP to the AC/BRAS.

Figure 1:
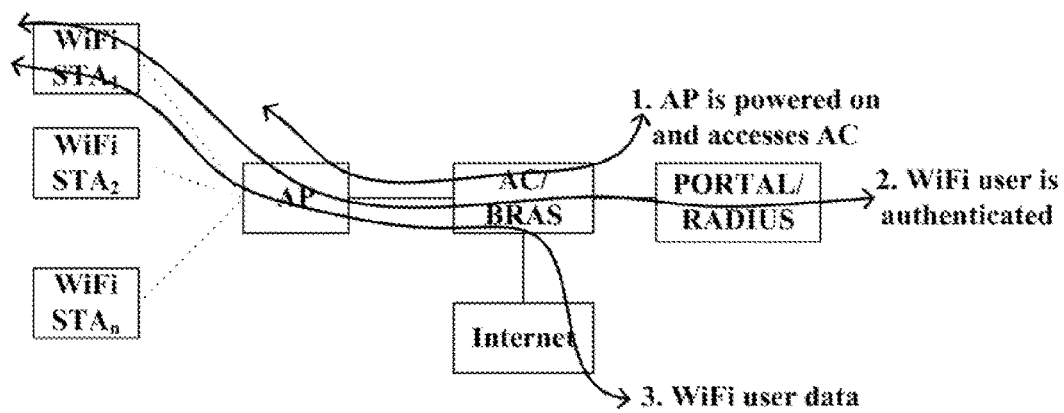
FIG. 1 is a schematic structural diagram of a WiFi network in the prior art.
Figure 2:
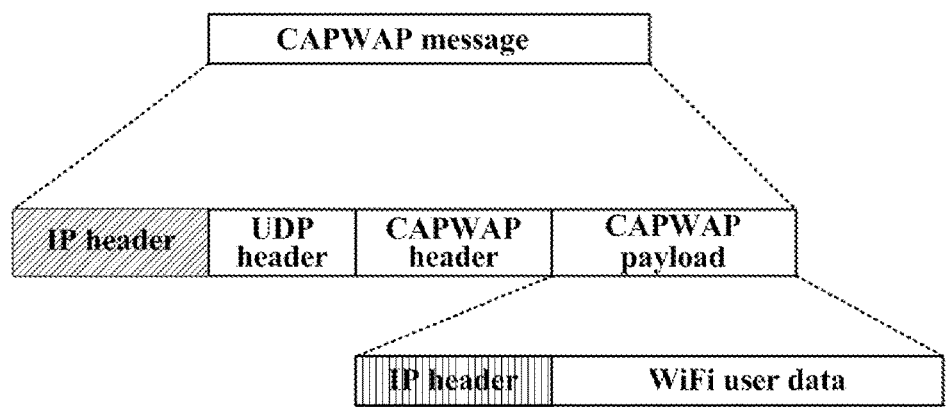
FIG. 2 is a schematic structural diagram of a CAPWAP message in the prior art.
Figure 3:
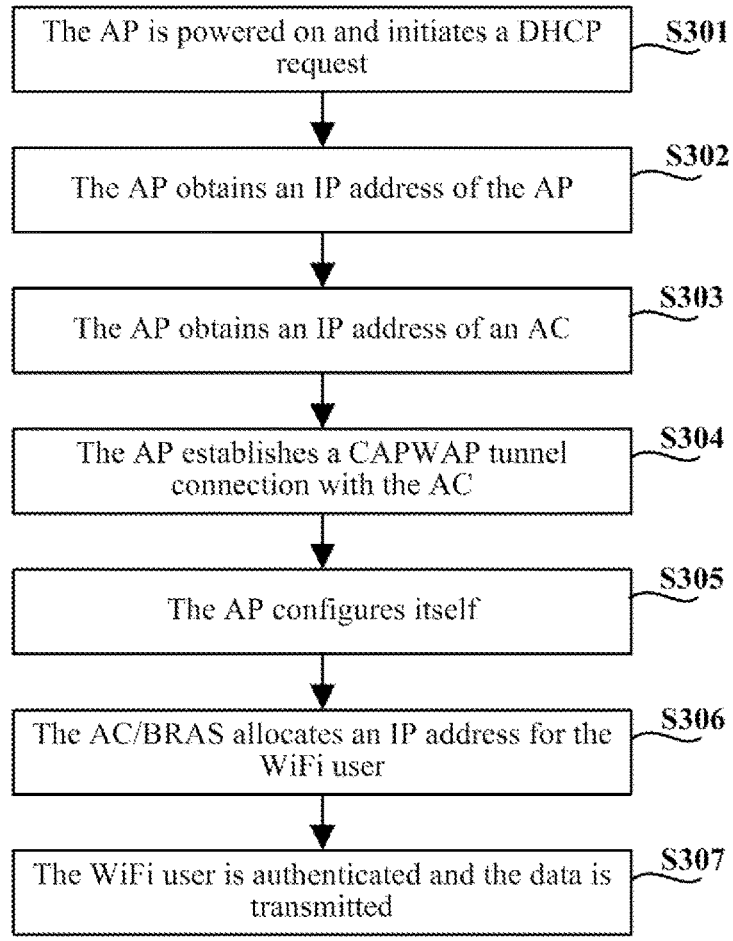
FIG. 3 is a flow chart of an access method for a WiFi access point in the prior art.
Figure 4:
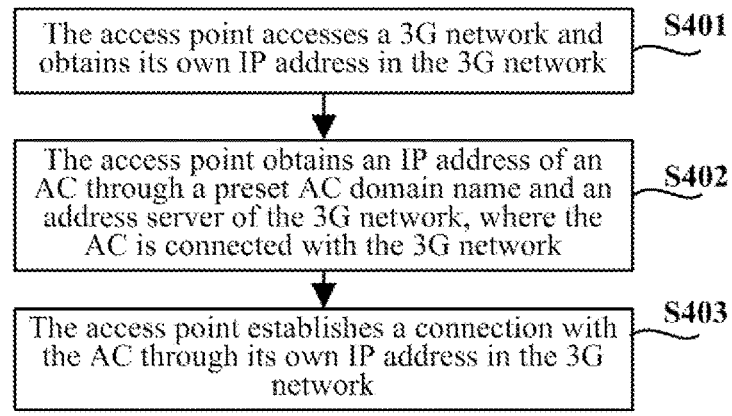
FIG. 4 is a flow chart of an access method for a WiFi access point in an embodiment of the present invention.

As illustrated in FIG. 4, an access method for a WiFi access point according to an embodiment of the present invention includes the following steps:

In the step S401, the access point accesses a 3G network and obtains its own IP address in the 3G network;

In the step S402, the access point obtains an IP address of an AC through a preset AC domain name and an address server of the 3G network, where the AC is connected with the 3G network; and In the step S403, the access point establishes a connection with the AC through its own IP address in the 3G network.

Since the access point and the AC are connected over the 3G network, the access point can access the AC/BRAS so along as the 3G network is available, thereby reducing the complexity of an access of the access point to the AC/BRAS and facilitating deployment of a larger number of WiFi access points.

The access point in the embodiment of the present invention has functions of a 3G terminal and can access the 3G network, and also the AC is connected with the 3G network, so the access point can be connected with the AC over the 3G network.

Since the AP accesses the 3G network as a 3G terminal, there is a wireless connection between the AP and the 3G network, and the AP may be arranged in a train, a bus or other high mobility-demanding scenario, to thereby improve a support of mobility by the WiFi network.

Figure 5:
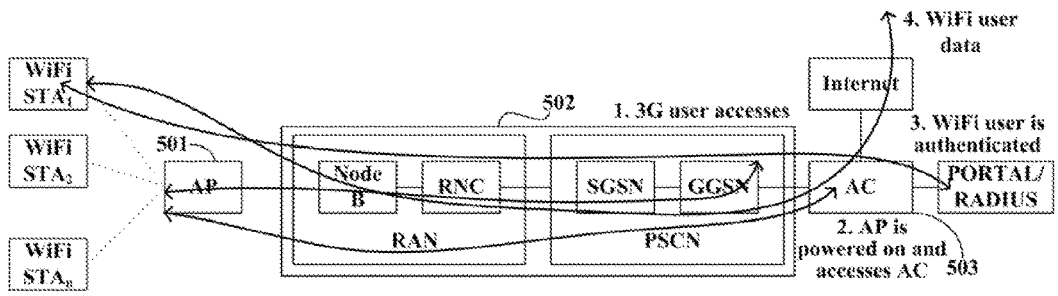
FIG. 5 is a schematic structural diagram of a WiFi network in an embodiment of the present invention.

As illustrated in FIG. 5, a WiFi system according to an embodiment of the present invention includes an access point 501, a 3G network 502 and an AC 503, wherein:

The access point 501 is configured to access the 3G network 502 and to obtain its own IP address in the 3G network 502; to obtain an IP address of the AC through a preset AC domain name and an address server of the 3G network 502; and to establish a connection with the AC through its own IP address in the 3G network 502; and The AC 503 is connected with the 3G network 502 and configured to establish the connection with the access point 501 upon reception of a connection request of the access point 501.

The 3G network includes a 3G Radio Access network (RAN) and a 3G Packet Switch Core Network (PSCN), wherein the 3G RAN includes a Node B and a Radio Network Controller (RNC), and the 3G PSCN includes a Serving GPRS Support Node (SGSN) and a Gateway GPRS Support Node (GGSN), and the AC is connected with the GGSN.

The AP is connected with a WiFi STA (A WiFi user equipment) via an air interface for wireless transmission in compliance with the specifications of the protocols IEEE802.11a/b/g/n, etc.; and also the AP has functions of a 3G terminal, and its interface to the 3G RAN is also an air interface for wireless transmission in compliance with the specifications of the related 3GPP protocols.

The AP accessing the WiFi network firstly needs to access the 3G network, and the AP is registered and authenticated in the 3G network, which means that the AP is a legal user of the 3G network and can make use of the 3G network resources. Since the domain name of the AC to be connected with and the address of the DNS server in the 3G network are preset in the AP, the AP device can obtain the IP address of the AC in the DNS server through the domain name of the AC before being connected with the AC.

Firstly, the AP which has accessed to the 3G network needs to trigger a Packet Data Protocol (PDP) activation procedure and obtains its own IP address in the 3G network; and is connected with the address server DNS of the 3G network through its own IP address in the 3G network; obtains the IP address of the AC through the preset AC domain name; and further interacts with the AC to initiate an authentication connection with the AC. The AC establishes a CAPWAP tunnel connection with the AP after the AC verifies the AR. The AP downloads a corresponding configuration file from the AC over the CAPWAP tunnel to obtain configuration information and configure itself.

When there is a WiFi user accessing through the AP, its user authentication and data transmission procedures are also performed over the CAPWAP tunnel except a CAPWAP message needs to be forwarded by the RAN and the PSCN.

During transmission of uplink data, WiFi user data with an IP header added thereto is packaged in the format of the CAPWAP protocol, and in the IP header of the WiFi data, a source IP is the IP address of the WiFi user, and a target IP is the IP address of a web accessed by the WiFi user. In the IP header of the CAPWAP message, a source IP is filled as the IP address of the AP in the 3G network, and a target IP is filled as the IP address of the AC. The data is transmitted transparently through the RAN/PSCN and arrives at the GGSN, and the GGSN routes the data according to the target IP and forwards the data to the AC.

During transmission of downlink data, the GGSN receives the data packet and then determines that the source IP in the IP header thereof is the IP address of the AC and the target IP is the IP address of the AP in the 3G network, and then the GGSN routes the data packet according to the target address by transmitting transparently the data packet through the PSCN/RAN, and the AP device obtains the WiFi user data from the CAPWAP message after the AP device receives the data packet and further forwards the WiFi user data to the corresponding user according to the IP header previously to the WiFi user data.

Figure 6A:
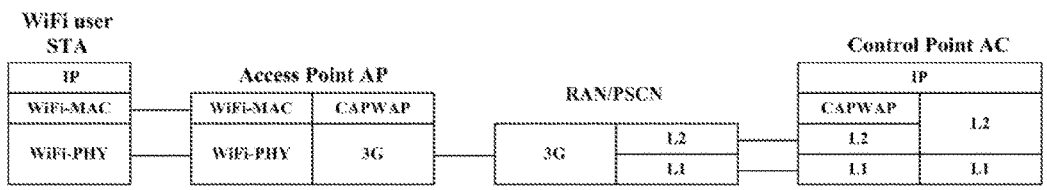
FIG. 6a is a schematic structural diagram of a protocol stack in an embodiment of the present invention.

In an embodiment of the present invention, a protocol stack of the CAPWAP tunnel is illustrated in FIG. 6a, wherein the WiFi user and the AP transmit data over the WiFi network, and data is transmitted between the AP and the AC over the 3G network and through the wired connection.

Figure 6B:
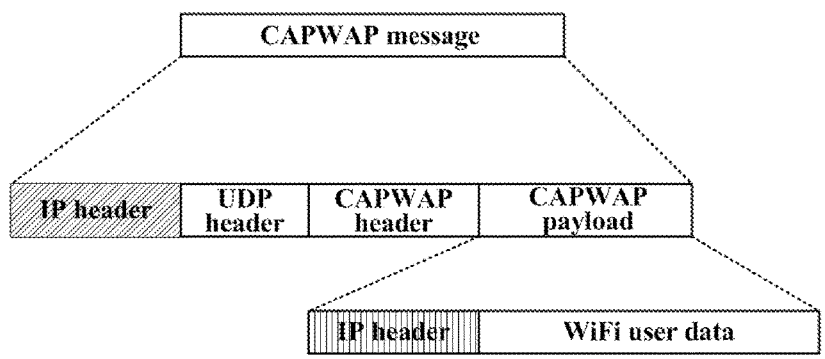
FIG. 6b is a schematic structural diagram of a CAPWAP message in an embodiment of the present invention.

In an embodiment of the present invention, a structure of the uplink CAPWAP message is illustrated in FIG. 6b and also includes an IP header, a UDP header, a CAPWAP header and a CAPWAP payload, wherein the CAPWAP payload further includes an IP header and WiFi user data, and in FIG. 6b, the IP header of the CAPWAP message is denoted by slashes, and in the IP header of the CAPWAP message, the source IP is the IP address of the AP in the 3G network, and the target IP is the IP address of the AC device; and the IP header of the CAPWAP payload is denoted by vertical lines, and in the IP header of the CAPWAP payload, the source IP is the IP of the WiFi user, and the target IP is the IP of an accessed web.

Figure 7:
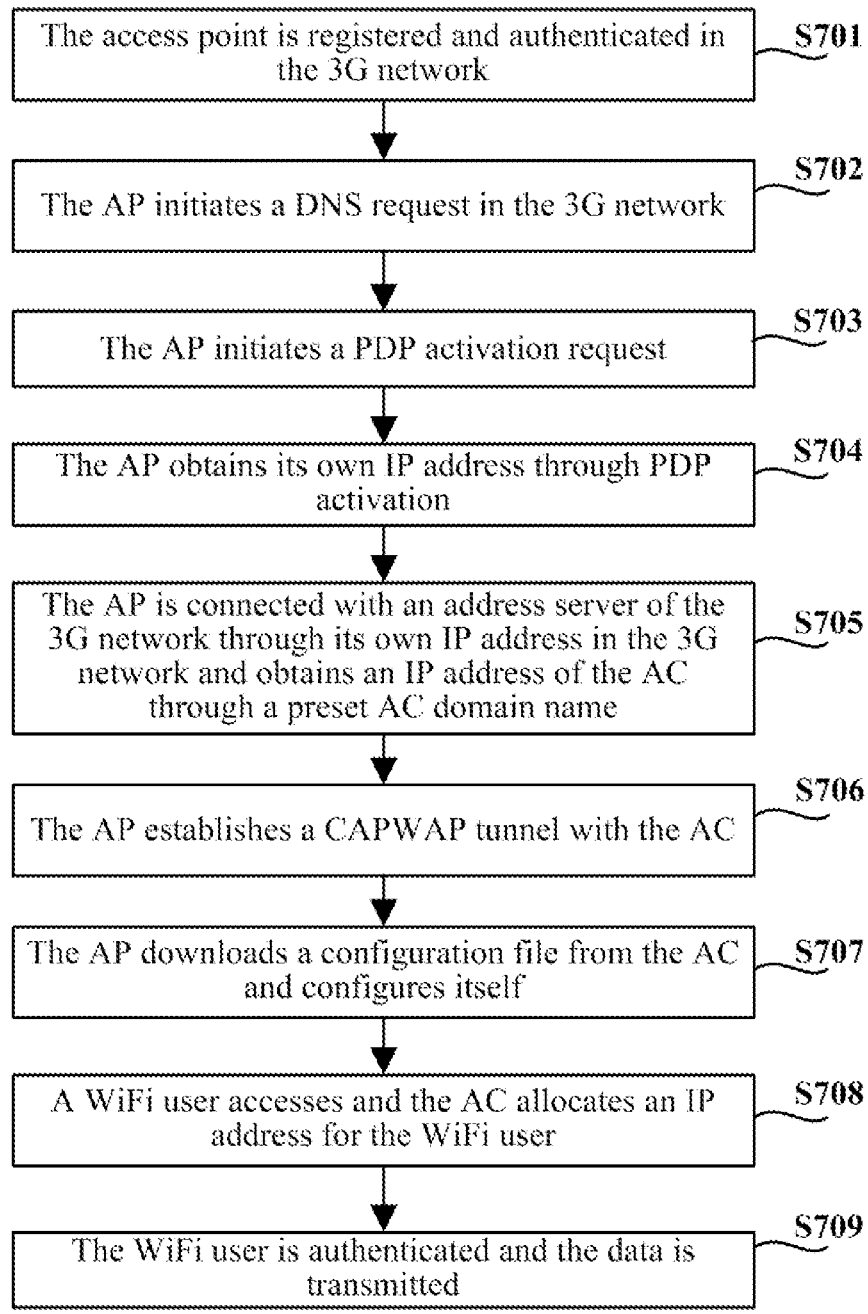
FIG. 7 is a flow chart of a specific access method for a WiFi access point in an embodiment of the present invention.

An access method for a WiFi access point according to an embodiment of the present invention will be described below in detail with reference to FIG. 7, wherein the method includes the following steps:

In the step S701, the access point is registered and authenticated in the 3G network;

In the step S702, the AP initiates a DNS request in the 3G network;

In the step S703, the AP initiates a PDP activation request;

In the step S704, the AP obtains its own IP address through PDP activation;

In the step S705, the AP is connected with an address server of the 3G network through its own IP address in the 3G network and obtains an IP address of an AC through a preset AC domain name;

In the step S706, the AP establishes a CAPWAP tunnel with the AC;

In the step S707, the AP downloads a configuration file from the AC and configures itself;

In the step S708, a WiFi user accesses, and the AC allocates an IP address for the WiFi user; and In the step S709, the WiFi user is authenticated and the data is transmitted.

The address server of the 3G network is a DNS server and the AC is connected with a GGSN in the 3G network.

Based upon the same inventive idea, an embodiment of the present invention further provides a WiFi access point, and since the WiFi access point addresses the problem under a principle similar to the access method for a WiFi access point and the WiFi system according to the embodiments of the present invention, reference can be made to the implementations of the method and the system for an implementation of the WiFi access point, and a repeated description thereof will be omitted here.

Figure 8:
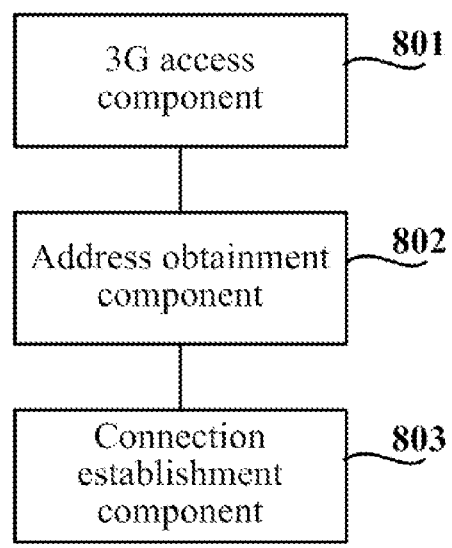
FIG. 8 is a schematic structural diagram of a WiFi access point in an embodiment of the present invention.

An embodiment of the present invention further provides a WiFi access point, as illustrated in FIG. 8, the WiFi access point includes:

a 3G access component 801 configured to access a 3G network and to obtain an IP address of the WiFi access point in the 3G network;

an address obtainment component 802 configured to obtain an IP address of an AC through a preset AC domain name and an address server of the 3G network, where the AC is connected with the 3G network; and a connection establishment component 803 configured to establish a connection with the AC through the IP address of the WiFi access point in the 3G network.

The 3G access component 801 is further configured:

to be registered and authenticated in the 3G network; and to perform PDP activation and to obtain the IP address of the WiFi access point in the 3G network.

The address obtainment component 802 is further configured:

to be connected with the address server of the 3G network through the IP address of the WiFi access point in the 3G network; and to obtain the IP address of the AC through the preset AC domain name.

The embodiments of the present invention provide an access method for a WiFi access point, a WiFi access point and a WiFi system, where an RAN and a PSCN in a 3G network are added to the WiFi system, and a 3G component is added to the AP, so that the AP can access the 3G network as a 3G terminal, and the AP can be connected with an AC/BRAS through the RAN and the PSCN, and since the coverage area of the 3G network is wide, an access of the access point over the 3G network can reduce the complexity of an access of the AP to the AC/BRAS.

Those skilled in the art shall appreciate that the embodiments of the present invention can be embodied as a method, a system or a computer program product. Therefore, the present invention can be embodied in the form of an all-hardware embodiment, an all-software embodiment or an embodiment of software and hardware in combination. Furthermore, the present invention can be embodied in the form of a computer program product embodied in one or more computer useable storage mediums (including but not limited to a disk memory, a CD-ROM, an optical memory, etc.) in which computer useable program codes are contained.

The present invention has been described in a flow chart and/or a block diagram of the method, the device (system) and the computer program product according to the embodiments of the present invention. It shall be appreciated that respective flows and/or blocks in the flow chart and/or the block diagram and combinations of the flows and/or the blocks in the flow chart and/or block diagram can be embodied in computer program instructions. These computer program instructions can be loaded onto a general-purpose computer, a specific-purpose computer, an embedded processor or a processor of other programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a process implemented by a computer so that the instructions executed on the computer or the other programmable device provide steps for performing the functions specified in the flow(s) of the flow chart and/or the block(s) of the block diagram.

Although the preferred embodiments of the present invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the present invention.

Evidently those skilled in the art can make various modifications and variations to the present invention without departing from the spirit and scope of the present invention. Thus the present invention is also intended to encompass these modifications and variations thereto so long as the modifications and variations come into the scope of the claims appended to the present invention and their equivalents.

The invention claimed is:

1. An access method for a WiFi access point, comprising:
   the access point accessing a Third Generation, 3G, network and obtaining its own Internet Protocol, IP, address in the 3G network;
   the access point obtaining an IP address of an Access Controller (AC) through a preset AC domain name and an address server of the 3G network, wherein the AC is connected with the 3G network; and
   the access point establishing a connection with the AC through its own IP address in the 3G network;
   wherein the access point establishing a connection with the AC through its own IP address in the 3G network comprising:
   the access point establishing a Control And Provisioning of Wireless Access Point Protocol (CAPWAP) tunnel with the AC; and
   the access point downloading a configuration file from the AC over the CAPWAP tunnel;
   wherein the access point is not directly connected with the AC, and the AC is connected with a Gateway GPRS Support Node (GGSN), in the 3G network.

2. The method according to claim 1, wherein the access point accessing the 3G network and obtaining its own IP address in the 3G network comprises:
   the access point being registered and authenticated in the 3G network; and
   the access point performing Packet Data Protocol, PDP, activation and obtaining its own IP address in the 3G network.

3. The method according to claim 1, wherein the access point obtaining the IP address of the AC through the preset AC domain name and the address server of the 3G network, comprises:
   the access point being connected with the address server of the 3G network through its own IP address in the 3G network; and
   obtaining the IP address of the AC through the preset AC domain name.

4. The method according to claim 1, wherein the address server of the 3G network is a Domain Name System, DNS, server.

5. A WiFi access point, comprising:
   a processor and a memory storing instructions executable by the processor, wherein execution of the instructions by the processor causes the processor to:
   access a Third Generation, 3G, network and obtaining an Internet Protocol, IP, address of the WiFi access point in the 3G network;
   obtain an IP address of an Access Controller, AC, through a preset AC domain name and an address server of the 3G network, wherein the AC is connected with the 3G network; and
   establish a connection with the AC through the IP address of the WiFi access point in the 3G network;
   wherein execution of the instructions by the processor further causes the processor to:
   establish a Control And Provisioning of Wireless Access Point Protocol (CAPWAP) tunnel with the AC; and
   download a configuration file from the AC over the CAPWAP tunnel;
   wherein the access point is not directly connected with the AC, and the AC is connected with a Gateway GPRS Support Node, GGSN, in the 3G network.

6. The access point according to claim 5, wherein execution of the instructions by the processor further causes the processor to:
   be registered and authenticated in the 3G network; and
   perform Packet Data Protocol, PDP, activation and to obtain the IP address of the WiFi access point in the 3G network.

7. The access point according to claim 5, wherein execution of the instructions by the at least one processor further causes the at least one processor to:
   be connected with the address server of the 3G network through the IP address of the WiFi access point in the 3G network; and
   obtain the IP address of the AC through the preset AC domain name.

8. A WiFi system, comprising an access point, a Third Generation (3G) network and an Access Controller (AC) wherein:
   the access point is configured to access the 3G network and to obtain its own Internet Protocol, IP, address in the 3G network; to obtain an IP address of the AC through a preset AC domain name and an address server of the 3G network, and to establish a connection with the AC through its own IP address in the 3G network; and
   the AC is connected with the 3G network and configured to establish the connection with the access point upon reception of a connection request of the access point;

wherein the access point is further configured to establish a Control And Provisioning of Wireless Access Point Protocol (CAPWAP) tunnel with the AC; and to download a configuration file from the AC over the CAPWAP tunnel;

wherein the access point is not directly connected with the AC, and the AC is connected with a Gateway GPRS Support Node, GGSN, in the 3G network.

9. The system according to claim 8, wherein the access point accesses the 3G network and obtains its own IP address in the 3G network comprises:

the access point is registered and authenticated in the 3G network; and the access point performs Packet Data Protocol, PDP, activation and obtains its own IP address in the 3G network.

10. The system according to claim 8, wherein the access point obtains the IP address of the AC through the preset AC domain name and the address server of the 3G network comprises:

the access point is connected with the address server of the 3G network through its own IP address in the 3G network; and obtains the IP address of the AC through the preset AC domain name.

\* \* \* \* \*